United States Patent [19]

Paquette et al.

[11] Patent Number: 5,229,207
[45] Date of Patent: Jul. 20, 1993

[54] FILM COMPOSITE HAVING REPOSITIONABLE ADHESIVE BY WHICH IT CAN BECOME PERMANENTLY BONDED TO A PLASTICIZED SUBSTRATE

[75] Inventors: Susan Z. Paquette, Stillwater, Minn.; Heiner Johannsen, Viersen, Fed. Rep. of Germany

[73] Assignee: Minnesota Mining and Manufacturing Company, St. Paul, Minn.

[21] Appl. No.: 737,590

[22] Filed: Jul. 25, 1991

Related U.S. Application Data

[63] Continuation of Ser. No. 513,680, Apr. 24, 1990, abandoned.

[51] Int. Cl.$^5$ .................. B32B 7/12; B32B 27/30; B32B 27/40
[52] U.S. Cl. .................. 428/355; 428/354; 428/353; 428/343; 524/591; 525/131
[58] Field of Search .................. 428/343–356; 524/591; 525/131

[56] References Cited

U.S. PATENT DOCUMENTS

| | | | |
|---|---|---|---|
| 3,547,852 | 12/1970 | Burke et al. | 260/29.6 |
| 4,287,013 | 9/1981 | Ronning | 428/355 |
| 4,376,151 | 3/1983 | Parrotta | 428/343 X |
| 4,461,795 | 7/1984 | Ogawa | 428/354 X |
| 4,550,052 | 10/1985 | Malek | 428/355 X |
| 4,605,592 | 8/1986 | Paquette et al. | 428/423.5 X |
| 4,766,177 | 8/1988 | Miller et al. | 525/131 |
| 4,952,876 | 5/1990 | Coogan et al. | 524/457 |
| 4,985,488 | 1/1991 | Landin | 428/355 X |
| 5,021,507 | 6/1991 | Stanley et al. | 525/127 |
| 5,045,386 | 9/1991 | Stan et al. | 428/354 X |
| 5,079,047 | 1/1992 | Bogaert et al. | 428/352 X |

FOREIGN PATENT DOCUMENTS

89/3036558 4/1989 European Pat. Off. .
89/3043232 4/1989 European Pat. Off. .

OTHER PUBLICATIONS

U.S. Appln. Ser. No. 196,441 (Atty Docket No. 42591USa3A) filed May 20, 1988; "Pressure-Sensitive Adhesive Having Improved Adhesion to Plasticized Vinyl Substrates".
U.S. Appln. Ser. No. 338,322 (Atty Docket No. 43232USA2A) filed Apr. 17, 1989; "Pressure-Sensitive Adhesive".
U.S. Appln. Ser. No. 305,202 (Atty docket No. 43810USA6A) filed Feb. 1, 1989; "Radiation-Curable Pressure-Sensitive Adhesive Having Improved Adhesion to Plasticized Vinyl Substrates".
U.S. Appln. Ser. No. 513,679 (Atty Docket No. 43884 USA 1A) filed Apr. 24, 1990; "Adhesive-Backed film Composite Which Can Become Permanently Bonded to a Plasticized Substrate".
Acrylic Adhesives, David R. Gehman, Technical Manager-Adhesives Research Dept. Rohm and Haas Company, Spring House, Pa., pp. 437–450.

*Primary Examiner*—George F. Lesmes
*Assistant Examiner*—D. R. Zirker
*Attorney, Agent, or Firm*—Gary L. Griswold; Walter N. Kirn; Carolyn V. Peters

[57] ABSTRACT

A film composite has a thin flexible decorative backing bearing a layer of adhesive which affords good repositionability and yet can become permanently bonded to highly plasticized substrates such as vinyl films containing migratable monomeric plasticizers. Such substrates include wall coverings and vinyl coated fabrics. The adhesive is a blend of an acrylic latex adhesive and a heat-activatable urethane latex adhesive, which blend has been coated onto the backing from an aqueous emulsion. Useful backings include vinyl, polyurethane, and polyolefin films.

5 Claims, No Drawings

FILM COMPOSITE HAVING REPOSITIONABLE ADHESIVE BY WHICH IT CAN BECOME PERMANENTLY BONDED TO A PLASTICIZED SUBSTRATE

This a continuation of application Ser. No. 07/513,680 filed Apr. 24, 1990, now abandoned.

BACKGROUND OF THE INVENTION

1. Field of the Invention

The invention is concerned with a flexible, adhesive-backed film composite that has an adhesive layer by which it can become permanently bonded to substrates containing migratable monomeric plasticizers, in spite of the tendency of such plasticizers to migrate into and to soften the adhesive. The invention is particularly concerned with the adhesive layer of such a film composite.

2. Description of the Related Art

As is pointed out in U.S. Pat. No. 4,605,592 (Paquette et al.), highly plasticized vinyl substrates previously had been decorated by hand painting or air brushing screen-printing inks. While prefabricated graphics in the form of adhesive-backed vinyl film bearing screen-printed graphics would have been less expensive, they had not been adapted for such use "due to the wrinkling of the vinyl film and loss of adhesion to the vinyl substrate ... attributable, at least in part, to the migration of monomeric plasticizers from the vinyl substrate into the vinyl film and adhesive" (col. 1, lines 24-33). These vinyl substrates contain as much as 25-100 parts of monomeric plasticizer, usually dioctylphthalate, to 100 parts of vinyl resin.

In general, low-cost monomeric plasticizers are more migratory than are those of higher cost, so that attempts by manufacturers of plasticized substrates to economize often exacerbate the problem of adhering a decorative, adhesive-backed flexible film to those substrates.

The Paquette patent provides a composite decorative, article that is capable of maintaining adhesion and remaining substantially wrinkle free when adhered to vinyl substrates that contain migratable monomeric plasticizer. The decorative film composite of the Paquette patent has (1) a polyvinyl chloride film layer that preferably is receptive to screen printing inks, (2) a layer of a plasticizer-resistant pressure-sensitive adhesive, e.g., a terpolymer of by weight 52.5 parts of n-butylacrylate, 37.5 parts methyl acrylate, and 10 parts acrylic acid, and (3) an intermediate, migratable-plasticizer barrier layer such as an aliphatic polyurethane resin. After being coated and dried, the adhesive can be crosslinked, e.g., by exposure to UV radiation when it contains a photocrosslinker such as benzophenone, thus making the adhesive layer more resistant to any plasticizer that migrates from a vinyl substrate. The pressure-sensitive adhesives of the examples of the Paquette patent are polymerized in solution and coated from solution.

SUMMARY OF THE INVENTION

The present invention provides an adhesive-backed film composite which, like the composite decorative article of the Paquette patent, has a thin, flexible backing that can be decorative. Like the composite decorative article of the Paquette composite, the adhesive of the novel film composite employs an acrylic polymer and can be pressure-sensitive, although it does not need to be tacky to the touch at ordinary room temperatures, and even when its adhesive layer is nontacky to the touch, the novel film composite becomes permanently bonded at room temperature under fingertip pressure to highly plasticized substrates such as vinyl films or vinyl coated papers, fabrics or scrims containing migratable monomeric plasticizer. Such substrates are used extensively, e.g., as wall coverings, soft side truck coverings, flexible signs, and awnings. Because the adhesive blend is resistant to plasticizers even without crosslinking, the manufacturing expense associated with crosslinking can be avoided.

In addition, the novel film composite has excellent positionability, repositionability, and removability features when first applied to a plasticized substrate. Then, after being properly positioned and subjected to pressure comparable to fingertip pressure, the novel composite quickly becomes permanently bonded to the substrate and, within a short time, would be very difficult to remove. It has also been shown that this adhesive blend when incorporated in with vinyl film composites can improve the appearance of the construction when applied and aged on plasticized substrates.

Briefly, the film composite of the invention has a thin, flexible backing which bears a layer of adhesive comprising, by weight, a blend of 1) from 10 to 99% of an acrylic latex adhesive and
2) from 1 to 90% of a heat-activatable urethane latex adhesive, a film of which has an elongation of at least 100%, which blend has been coated from an aqueous emulsion.

As compared to an otherwise identical composite except omitting the heat-activatable urethane latex adhesive from the adhesive layer, the adhesive blend of the novel composite tends to provide better adhesive values even though the bonds are made at ordinary room temperatures. This improvement is surprising, considering that the urethane latex adhesive by itself must be heat activated.

The acrylic latex adhesive and heat-activatable urethane latex adhesive are most easily blended together when approximately equal in pH and emulsifier charge. Preferably, their emulsifiers are both anionic or both cationic or one is anionic while the other is nonionic.

In general, any coalescing agent present in either latex should be compatible with the other latex.

A preferred acrylic latex adhesive is an acrylic emulsion polymer of a) from 84 to 100 parts of acrylic acid ester of nontertiary alcohol, the alkyl groups of which contain an average of from 2 to 12 carbon atoms, and
b) correspondingly from 16 to 0 parts of an ethylenically unsaturated, copolymerizable monomer.

Optimum resistance to migratable monomeric plasticizer is achieved when the relationship of said average number of carbon atoms in the alkyl groups is from 2 to 5, more preferably from 2 to 3. By keeping that average low, the adhesive blend tends to have low initial adhesion values, thus enhancing repositionability, but adhesion tends to build to a desirably high level within a reasonably short period of times. Furthermore, when said average number of carbon atoms is low, the adhesive blends tend to have superior resistance to shear forces.

When the above-identified monomer a) or blend of monomers a) and b) is or are emulsified in a surfactant system with a free-radical initiator, polymerization readily proceeds to completion (>98% conversion) at moderately elevated temperatures, and an inherent viscosity of more than 5.0 is readily attained without further processing. When the resulting latex is filtered, typically less than 0.01 g of coagulum per 1000 g latex is collected.

Because the blend of acrylic latex and urethane latex adhesive is coated from an aqueous emulsion, it should be unnecessary to employ apparatus to prevent volatiles from polluting the atmosphere.

The adhesive layer of the novel film composite can be a blend of the urethane latex adhesive and an acrylic emulsion homopolymer of monomer a). However, stronger bonds to plasticized substrates are obtained from the use of acrylic emulsion copolymers of monomers a) and b), especially when monomer b) is highly polar, and there is no current economic advantage in avoiding the use of a highly polar monomer b). Useful highly polar monomers include acrylic acid, methacrylic acid, acrylamide, methacrylamide, itaconic acid, acrylonitrile, methacrylonitrile, and itaconic acid. Other useful copolymerizable monomers b) include methylmethacrylate, vinyl acetate, N-vinyl pyrrolidone, and styrene sulfonate.

The heat-activatable urethane latex adhesive employed in the adhesive layer of the novel film composite should have an elongation of at least 200% and preferably at least 400%. Otherwise, the adhesive may be unduly firm and may afford undesirably low adhesion values. Best results have been obtained with polyester polyurethanes when compared with polycarbonate polyurethanes and polyether polyurethanes. Similar functionality of the plasticizer in the vinyl, typically a phthalate ester or polymeric polyester, and the polyester polyurethane is the reason for the improved performance of this construction.

DETAILED DESCRIPTION

The flexible backing of the novel film composite preferably is a decorative polymeric film such as polyurethane, polyolefin, and plasticized vinyl films or a soft metallic film such as aluminum. When the backing is a polyurethane film, it is more durable when it is aliphatic. Plasticized vinyl films are currently less expensive than polyurethane films and are widely used in the graphics industry because of their versatility, durability, and low cost. When the backing is a plasticized vinyl film, its plasticizer preferably is primarily a nonmigratable polymeric plasticizer. Preferred vinyl backings are disclosed in the Paquette patent and are available as SCOTCHCAL TM Film Series 3650 and CONTROL-TAC TM Film Series 180 from 3M, to which the present application is assigned.

A novel film composite that has a vinyl backing preferably incorporates a barrier layer as disclosed in the Paquette patent, thus better protecting the film backing from becoming wrinkled by migratable monomeric plasticizers of substrates to which the novel film composite may be adhered.

A preferred heat-activatable urethane latex adhesive is a polyester-polyurethane latex, a film of which has an elongation of about 500% and is commercially available as "Baybond" 402A from Mobay.

The acrylic latex adhesive of the adhesive blend of the film composite of the invention preferably is a copolymer of monomer a) selected from ethyl acrylate and n-butyl acrylate and a highly polar monomer b). For example, preferred adhesive blends employ acrylic emulsion copolymers of, by weight from 50 to 90 parts of ethyl acrylate,
from 10 to 50 parts of n-butyl acrylate, and
from 2 to 12 parts of a copolymerizable, highly polar monomer selected from acrylic acid and methacrylic acid.

Optimum resistance to migratable plasticizers is achieved when at least 65% of ethyl acrylate is employed.

Preferably, the acrylic latex adhesive has a calculated Tg of from 0° C. to −50° C. If its calculated Tg were substantially above that preferred range, the adhesion of the novel film composite might fail at low temperatures upon being subjected to stresses such as from impact or vibrations. If its calculated Tg were substantially below that preferred range, the adhesive layer of the novel film composite might be too tacky to permit it to be repositioned before it has been pressed into full contact with a substrate.

TESTING

180° Pullback Value

180° pullback adhesions are run according to ASTM D-1000, Method B, with an Instron tester. The adhesion tests are conducted on specimens after dwell as indicated.

In the following examples, all parts are by weight.

EXAMPLE 1

A titanium dioxide pigmented, plasticized poly(vinylchloride) film 50 μm in thickness while supported by a paper carrier web was coated with a 40% solids aqueous emulsion of a blend of equal parts of 1) an acrylic emulsion copolymer of 80 parts ethyl acrylate, 16 parts n-butyl acrylate, and 4 parts acrylic acid, and
2) heat-activatable polyester-polyurethane latex ("Baybond" 402A from Mobay). The coating was dried 10 minutes at 66° C. to a dry coating weight of 50 mg/m². The adhesive side was then laminated to a silicone release liner, and the paper carrier web was discarded to provide an adhesive-backed film composite of the invention.

The composite was tested for 180° Pullback Adhesion Value from a plasticized vinyl substrate, viz., "Duraskin" from Verseidag Industrie texilien, West Germany, and having a weight of 18 ounces/yd²(610 g/m²). Table I reports the results after the indicated dwell.

TABLE I

| 180° Pullback Adhesion Value (N/cm) | | | | |
|---|---|---|---|---|
| Initial | 2 hr, R.T. | 24 hr, R.T. | 1 wk., 66° C. | 2 wk., 66° C. |
| 3.9 | 5.6 | 5.6 | 7.7 | 12.0 |

The relatively low initial adhesion was the result of good repositionability of the adhesive, but as shown after accelerated aging, adhesion eventually built to a satisfactory level.

EXAMPLES 2–8

A series of adhesive-backed film composites were prepared and tested as in Example 1 except using differing ratios of the acrylic latex adhesive and urethane latex adhesive as indicated in Table II. Also, the 180° Pullback Adhesion Values were from a different plasticized vinyl substrate, viz., "Prismax" 14 oz awning material from Advanced Vinyl, Inc. The composite of Example 5 was identical to that of Example 1, and Examples 2 and 8 were comparative.

TABLE II

| Example | acrylic/ urethane ratio | 180° Pullback Adhesion Value (N/cm) after | | |
|---|---|---|---|---|
| | | 24 hr, R.T. | 1 wk., 66° C. | 2 wk., 66° C. |
| 2 | 100/0 | 1.4 | * | * |
| 3 | 90/10 | 3.9 | 13.0 | 13.0 |
| 4 | 75/25 | 4.6 | 12.8 | 13.0 |
| 5 | 50/50 | 6.9 | 12.8 | 13.0 |
| 6 | 25/75 | 6.0 | 9.5 | 9.1 |
| 7 | 10/90 | 5.3 | 7.9 | 7.0 |
| 8 | 0/100 | 5.1 | 5.6 | 5.5 |

* Inadequate initial adhesion

EXAMPLE 9

An adhesive-backed film composite was prepared as in example 1 except replacing the acrylic emulsion copolymer with a commercially available acrylic latex adhesive, viz., "EVA-TAK" 72-9685 from National Starch. The resulting composite was tested on the plasticized vinyl substrate ("Prismax") employed in Examples 2-8. Test results are reported in Table III together with a comparative composite A that was an identical acrylic adhesive from the adhesive blend.

TABLE III

| Example | acrylic/ urethane ratio | 180° Pullback Adhesion Value (N/cm) after | | |
|---|---|---|---|---|
| | | 24 hr, R.T. | 1 wk., 66° C. | 2 wk., 66° C. |
| 9 | | 5.3 | 9.5 | 10.0 |
| A | | 6.3 | 1.6 | 1.4 |

What is claimed is:

1. An adhesive-backed film composite comprising a thin flexible backing bearing a layer of adhesive by which the film composite can become permanently bonded to a substrate containing monomeric plasticizer, said adhesive comprising, by weight, a blend of
   1) from about 10 to 99% of an acrylic latex adhesive, wherein said acrylic latex adhesive has a glass transition temperature of 0° C. to −50° C. and is an acrylic emulsion polymer of
      a) from 84 to 100 parts of acrylic acid ester of non-tertiary alcohol, the alkyl groups of which contain an average of from 2 to 12 carbon atoms, and
      b) correspondingly from 16 to 0 parts of an ethylenically unsaturated copolymerizable monomer, wherein said monomer is selected from the group consisting of acrylic acid, methacrylic acid, acrylamide, methacrylamide, itaconic acid, acrylonitrile, methacrylonitrile, methlmethacrylate, vinyl acetate, N-vinyl pyrrolidone and styrene sulfonate;
   2) from 1 to 90% of a heat-activatable urethane latex adhesive, a film of which has an elongation of at least 100%, wherein said blend has been coated onto the backing rom an aqueous emulsion.

2. The adhesive-backed film composite as defined in claim 1 wherein said acrylic acid ester is a mixture of, by weight,
   from 50 to 90% of ethyl acrylate and correspondingly from 50 to 10% of n-butyl acrylate, and said ethylenically unsaturated, copolymerizable monomer is 1 to 16% of highly polar monomer, wherein said polar monomer is selected from the group consisting of acrylic acid, methacrylic acid, acrylamide, methacrylamide, itaconic acid, acrylonitrile, and methacrylonitrile.

3. The adhesive-backed film composite as defined in claim 2 wherein the amount of said highly polar monomer is from 2 to 12% by weight.

4. A laminate of a vinyl substrate containing migratable plasticizer and an adhesive-backed film composite comprising a thin flexible backing selected from vinyl, polyurethane, and polyolefin films, which backing bears a layer of adhesive comprising, by weight, a blend of
   1) from about 10 to 99% of an acrylic latex adhesive, wherein said acrylic latex adhesive is an acrylic emulsion polymer of
      a) from 84 to 100 parts of acrylic acid ester of non-tertiary alcohol, the alkyl groups of which contain an average of from 2 to 12 carbon atoms, and
      b) correspondingly from 16 to 0 parts of an ethylenically unsaturated, copolymerizable monomer, wherein said monomer is selected from the group consisting of acrylic acid, methacrylic acid, acrylamide, methacrylamide, itaconic acid, acrylonitrile, methacrylonitrile, methylmethacrylate, vinyl acetate, N-vinyl pyrrolidone and styrene sulfonate;
   2) from 1 to 90% of a heat-activatable urethane latex adhesive, wherein said urethane latex adhesive is polyester polyurethane and a film of which has an elongation of at least 100%, wherein said blend has been coated onto the backing from an aqueous emulsion.

5. The laminate as defined in claim 4 wherein said vinyl substrate is selected from the group consisting of vinyl films, vinyl-coated paper, fabric, and scrim.

* * * * *

UNITED STATES PATENT AND TRADEMARK OFFICE
CERTIFICATE OF CORRECTION

PATENT NO.   :   5,229,207
DATED        :   July 20, 1993
INVENTOR(S)  :   Paquette et al.

It is certified that error appears in the above-identified patent and that said Letters Patent is hereby corrected as shown below:

Col. 4, line 37, Insert --a-- before "heat-activatable"

Col. 4, line 47, Insert a space between "ounces/yd$^2$" and "(610 g/m$^2$)"

Col. 6, line 7, Replace "rom" with --from--

Signed and Sealed this

Nineteenth Day of April, 1994

Attest:

BRUCE LEHMAN

Attesting Officer

Commissioner of Patents and Trademarks